United States Patent
Feinleib et al.

(10) Patent No.: US 7,284,043 B2
(45) Date of Patent: Oct. 16, 2007

(54) SYSTEM AND METHOD FOR AUTOMATED MIGRATION FROM LINUX TO WINDOWS

(75) Inventors: David A. Feinleib, Palo Alto, CA (US); Brian K. Moran, Preston, WA (US)

(73) Assignee: Centeris Corporation

( * ) Notice: Subject to any disclaimer, the term of this patent is extended or adjusted under 35 U.S.C. 154(b) by 0 days.

(21) Appl. No.: 10/948,927

(22) Filed: Sep. 23, 2004

(65) Prior Publication Data

US 2006/0064474 A1 Mar. 23, 2006

(51) Int. Cl.
G06F 15/16 (2006.01)

(52) U.S. Cl. ............... 709/220; 719/319

(58) Field of Classification Search ........ 709/220–222, 709/223, 224, 230, 200–203; 710/1–2; 719/319
See application file for complete search history.

(56) References Cited

U.S. PATENT DOCUMENTS

| | | | |
|---|---|---|---|
| 6,817,017 B2* | 11/2004 | Goodman | 719/310 |
| 6,915,287 B1* | 7/2005 | Felsted et al. | 707/1 |
| 2002/0129277 A1* | 9/2002 | Caccavale | 713/201 |
| 2003/0023874 A1* | 1/2003 | Prokupets et al. | 713/201 |
| 2003/0033535 A1* | 2/2003 | Fisher et al. | 713/185 |
| 2003/0191868 A1* | 10/2003 | Espino | 709/328 |
| 2004/0199609 A1* | 10/2004 | Papatia et al. | 709/220 |

OTHER PUBLICATIONS

Author Unknown. "MSDSS Deployment: Understanding Synchronization and Migration". Microsoft Corporation. Published Jun. 2000.*
Nicholes, Brad. "How to Use NDS eDirectory to Secure Apache Web Server for NetWare". Novel Appnotes. Published Feb. 2001.*
NOS showdown: NT vs. Linux; while Microsoft has the edge over Linux as a server operating system for the enterprise, don't count the little guy out, Henderson, Tom, network World, p53(1), May 17, 1999.*

* cited by examiner

Primary Examiner—Moustafa Meky
(74) Attorney, Agent, or Firm—Law Office of R. Alan Burnett

(57) ABSTRACT

A system and method for automating the migration of configuration settings and data from computer systems running the LINUX operating system to computer systems running the WINDOWS operating system. The invention utilizes data from one or more sources to create the configuration of the target system, and translates between settings related to the LINUX systems and WINDOWS systems involved. As a result, it simplifies the otherwise complex and time-consuming task of migrating from one server to another, specifically when migrating between two operating systems that provide similar functionality but are configured in distinctly different ways.

20 Claims, 10 Drawing Sheets

US 7,284,043 B2

SYSTEM AND METHOD FOR AUTOMATED MIGRATION FROM LINUX TO WINDOWS

FIELD OF THE INVENTION

The field of invention relates generally to a system and method for the automated migration of a system running a member of the LINUX family of operating systems to a system running a member of the WINDOWS family of operating systems.

BACKGROUND INFORMATION

It can be appreciated that a large number of server computers in operation today run a version of the LINUX family of operating systems, such as Red Hat Enterprise LINUX AS 3. These operating systems provide services to client computers, such as access to data stored in shared directories, access to printers connected to the server, user authentication services, networking services, directory services, etc.

It can also be appreciated that a large number of server computers run a member of the WINDOWS family of operating systems, such as WINDOWS 2000 Server Standard Edition and WINDOWS NT 4.0.

One skilled in the art will recognize that operating system services and applications are typically configured according to the user's needs, and that such configuration settings are stored through a persistent mechanism, such as an on-disk file, so that when the system is reset or restarted, the configuration settings can be read and the service or application can run with the stored settings; in this way the user does not have to reconfigure the settings from scratch.

WINDOWS and LINUX provide many similar functions, such as the ability for client computers to access data on a server and to display text and graphics on a computer screen. On WINDOWS, for example, file and print sharing via the Server Message Block (SMB) protocol and user authentication via the NT LAN Manager protocol (NTLM) is provided by the operating system itself. Similar functionality is provided on LINUX, but requires additional modules to be installed. Advanced Server for UNIX, ported to LINUX, is one application that provides file, print, and authentication via the SMB and NTLM protocols. Samba is another application that provides such functionality. Syntax Totalnet Advanced Server is a third such product.

Although the functions provided are similar between the two operating systems, often they are provided or configured in different and incompatible ways. For example, configuration settings related to file shares are stored in a set of data files called the system registry on WINDOWS, while configuration settings related to file shares are stored in text based configuration files on LINUX, e.g. a format that is different from its counterpart on WINDOWS. Similarly, data related to directory services, which, as the name suggests, deals with information about the people and resources available on a given computer system or network, is stored in the Active Directory on WINDOWS, but is stored using OpenLDAP or other software on LINUX. Likewise, configuration settings for Internet Information Server (IIS), a web server that runs on WINDOWS, are stored in the WINDOWS registry, while configuration settings for Apache, a web server often deployed on LINUX, are stored in a text file named HTTPD.CONF.

While the LINUX operating system has existed for a number of years, it is only recently that it has reached a point of viability and stability that system administrators have begun deploying servers running LINUX where formerly they might have run WINDOWS. However, having deployed one or more servers running the LINUX operating system, system administrators often discover that a mixed environment, that is, one running WINDOWS and LINUX, is more difficult and expensive to manage and maintain than one in which server computers run only the WINDOWS operating system. For these reasons and others, they desire to migrate the services provided and data stored on servers running the LINUX operating system to WINDOWS.

Due to the incompatibility in the ways in which the two operating system families are configured and the ways in which they store configuration settings, however, this task is a difficult, time-consuming, and error-prone manual process. In particular, an administrator must understand the particular settings in question on WINDOWS, and the corresponding settings on LINUX. Often, administrators are hampered by their lack of experience on one or the other of the two operating systems, the difficulty of finding the appropriate settings on either system, the challenge of translating between the settings of the two systems, and the need to configure software on the WINDOWS system to have it provide the equivalent functions as the LINUX system.

The problem of migration is not a new one, as administrators have been confronted with the problem of moving from an old version of an operating system to a new version for years. Alternatively, administrators have been forced to move from one physical machine to another to take advantage of new hardware capabilities or because of a desire to move off an old piece of hardware. However, these migrations have been fairly simple given the relative compatibility in settings between the old and new operating system versions or between the two machines, which may even be running the same version of the operating system.

The present invention addresses the aforementioned problem by automating the migration process from LINUX to WINDOWS, as it relates both to configuration information and to data.

SUMMARY OF THE INVENTION

In accordance with aspects of the present invention, systems and methods are disclosed that address the foregoing computer system migration, translation, and configuration problems, and more specifically but not exclusively relate to a set of software tools, wizards, translation modules, discovery modules, installation and configuration modules, and processes used to automate the currently manual process of migrating from WINDOWS to LINUX.

According to one set of techniques, the source discovery wizard determines the services running on the LINUX machine. Then, if the target system already has WINDOWS installed on it, the target discovery wizard module determines if any additional services need to be installed on the target and/or if any services must be removed for the system to provide the services required as indicated by the discovery wizard. The configuration module generates a list of required modifications. If the target system does not already have WINDOWS installed on it, the configuration module creates an installation configuration file for use by the operating system installation program, ensuring that the operating system installation program will install the required software.

According to one set of techniques, a configuration conversion tool translates the settings on LINUX to their counterparts on WINDOWS. Lookup tables are employed to determine the proper mapping between configuration settings on the two systems. Such settings may include, but are not limited to, the names and paths of file shares, printer resources, directory information, user and group settings, etc. The result of the translation is a list of now translated target settings, which may be stored in a variety of forms, including, but not limited to, a text or binary file, or may be communicated directly to another module or application without being stored.

According to another set of techniques, the target installer configures the target system appropriately, with the result that it has the necessary software installed to provide the required services. This may include the automatic downloading of required software from the Internet or from an internal file server or Intranet site, prompting the user to insert various media such as CDs containing the necessary software, etc.

According to another set of techniques, the target configuration module configures the services on the target based on the target configuration list or via direct communication from the configuration conversion tool. Configuration includes but is not limited to, the configuration of file and print services, directory services, authentication services, and network services. As part of configuring file services, directories may be created. As part of configuring print services, print drivers may be installed.

According to another set of techniques, the data move module moves data files from the LINUX system to the WINDOWS system. In one embodiment, the data is stored on an intermediate file server. One skilled in the art will recognize that such a file server could be a server on the Internet, an Intranet web server, or a file server. The data move module may be configured to filter files to be moved based on specified criteria, such as the names or extensions of files, or the size of files. In an innovative technique, the data move module may also scan for viruses or call an external program to scan for viruses as an integrated part of the copy or move operation.

According to another set of techniques, translated configuration information is stored on a repository server, which stores one or more configurations such that the translated configuration can be deployed to another WINDOWS server, for example, in case of failure.

According to further techniques, a configuration conversion tool migrates settings from a LINUX server running the enterprise directory services repository OpenLDAP to a WINDOWS server running the enterprise directory services program Active Directory.

In one embodiment, the tools, wizards, and other modules are controlled by the administrator completely from a system running the WINDOWS operating system, e.g. the source server, or another system running WINDOWS and accessing the same network. This means that the administrator need not interact directly with the LINUX system, unless desired, at any point during the process. In another embodiment, all tools, wizards, one or more tools, wizards, and modules run on the LINUX operating system so that an administrator can perform migration without interacting directly with a WINDOWS system, unless desired.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for facilitating migration between operating systems, such as from a LINUX operating system to a WINDOWS operating system are described herein. In the following description, numerous specific details are set forth (such as the Perl scripting language) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
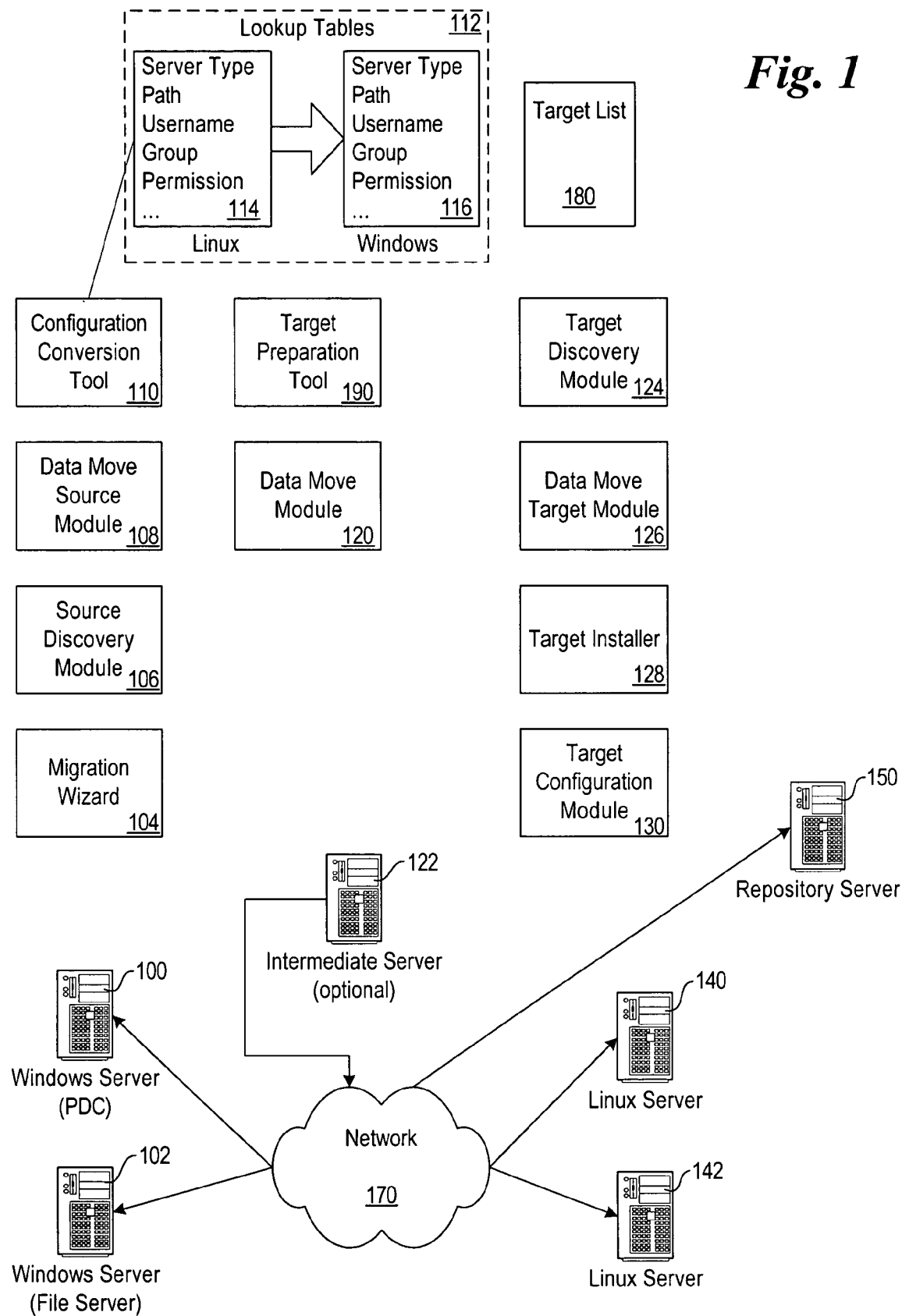
FIG. 1 is a schematic drawing of a software architecture including various modules that enables migration between a LINUX and a WINDOWS operation system, according to one embodiment of the invention.

FIG. 1 shows a software architecture including various modules that enables migration between a LINUX and a WINDOWS operating system. An exemplary set of servers used for explaining the migration process, according to one embodiment, are shown in FIG. 1. These include WINDOWS servers 100 and 102, an optional intermediate server 122, LINUX servers 140 and 142, and a repository server 150, all of which are linked in communication via a network 170. The software modules include a migration wizard 104, a source discovery module 106, a data move source module 108, a configuration conversion tool 110, a target preparation tool 190, a data move module 120, a target discovery module 124, a data move target module 126, a target installer 128, and a target installation module 130.

Figure 3:
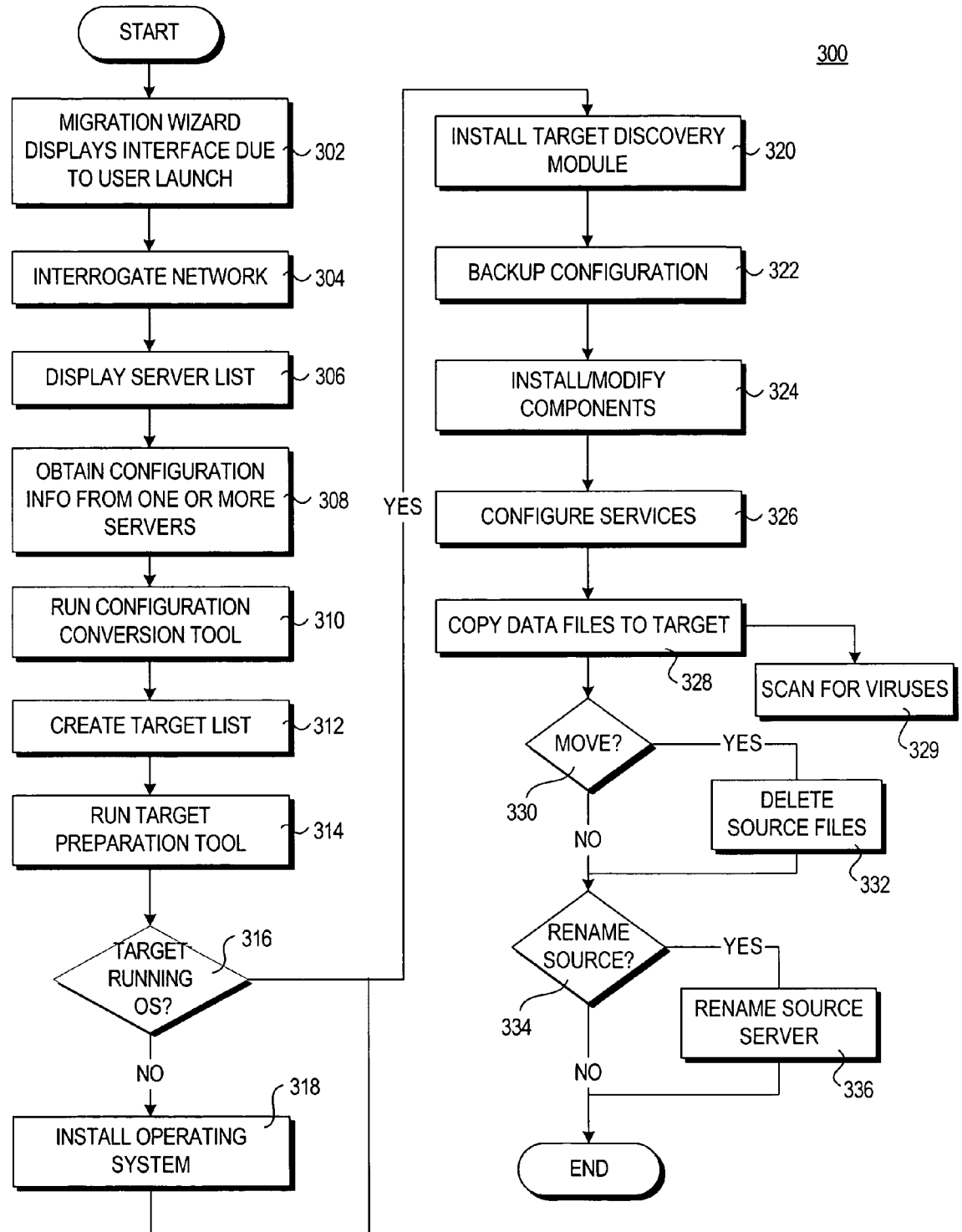
FIG. 3 is a flowchart illustrating operations and logic performed during one portion of the LINUX to WINDOWS migration process, according to one embodiment of the invention.

In one embodiment, Migration Wizard 104 is installed and run by an administrator on WINDOWS Server 102. Thus commences a migration process 300 shown in FIG. 3. First, Migration Wizard 104 presents a graphical user interface to the user in a block 302, which guides the user through the migration process and controls the operation of the modules associated with the migration process. One skilled in the art will recognize that such an interface could also be presented through a variety of other means, including, but not limited to, text or voice based interfaces. In one embodiment, Migration Wizard 104 is installed on another system (not shown) running WINDOWS that is connected to Network 170. Such connection can take place via a wired or wireless link, running any of a variety of protocols.

In a block 304, Source Discovery Module 106 interrogates Network 170 to determine the kind of servers running on the network. Source Discovery Module 106 can also be directed by the user to interrogate a particular system on the network, such as WINDOWS Server 102. Migration Wizard 104 prompts the user for a username and password, if required, so that it can use those credentials to access the network and one or more systems on the network.

Having discovered the systems on the network or having been directed to a particular server by the user, Migration Wizard 104 presents a list of servers available for migration in a block 306. Migration Wizard 104 displays additional information to the user related to the servers shown, including, but not limited to, the type of each server. Types of servers that are supported and displayed include, but are not limited to, servers running versions of WINDOWS NT 4, WINDOWS 2000 server, and WINDOWS 2003 server. Available target servers are presented to the user or the user may specify a particular system, for example, by name or IP address. In addition, more specific information about each server may be displayed, such as whether it is a Primary Domain Controller, a Backup Domain Controller, a stand-alone server, etc.

Based on the server the user wishes to migrate, Source Discovery Module 106 obtains configuration information from one or more LINUX servers in a block 308. LINUX Server 140 is a Primary Domain Controller (PDC), which contains the master directory services information and permissions data (usernames, passwords, and group names), LINUX Server 142 is a File Server that is a member of the Domain but does not itself contain permissions or directory services data. In one embodiment, where LINUX Server 142 is the server selected for migration, Source Discovery Module 106 must obtain information both from LINUX Server 140 and LINUX Server 142; from LINUX Server 140 it obtains directory services, permissions, and other configuration information; from LINUX Server 142 it obtains configuration information specific to LINUX Server 142, such as the directories that have been shared on LINUX Server 142. Migration Wizard 104 can support the selection of one or more servers to be migrated, such servers to be migrated one at a time, sequentially, or in parallel.

In one embodiment, the Migration Wizard 104 now runs the Configuration Conversion Tool 110 in a block 310. In general, Configuration Conversion Tool 110 may be implemented as a separate program, as a series of functions in the Migration Wizard 104, as a dynamic link library or via a variety of other means. In another embodiment, the configuration conversion tool runs remotely, on another system (not shown).

Configuration Conversion Tool 110 uses information from Source Discovery Module 106 in combination with Lookup Tables 114 and 116 to create Target List 180 in a block 712. Target List 180 specifies not only the translated settings to be configured on the target server, such as WINDOWS Server 100, but also the operating system, software modules, and applications required for WINDOWS Server 100 to provide the equivalent services as those that are provided by LINUX Server 140 or LINUX Server 142.

In a block 314, Migration Wizard 104 runs Target Preparation Tool 190 to evaluate target WINDOWS Server 100. In one embodiment, if target WINDOWS Server 100 is discovered to be already running an operating system in a decision block 316, then Migration Wizard 104 attempts to install Target Discovery Module 124 on target WINDOWS Server 140, as depicted in a block 320. It should be noted that Migration Wizard 104 prompts the user, as necessary, for username and password information so that Target Preparation Tool 190 can access WINDOWS Server 100 with the proper credentials. In another embodiment, the user installs Target Discovery Module 124 on WINDOWS Server 100 by installing the software from a CD-ROM or other media, or from a server accessible on the network. If WINDOWS Server 100 is discovered not to be running an operating system in block 316, then Target Preparation Tool 190 installs the operating system in a block 318. In general, the operating system can be installed from a variety of sources, such as a computer on the network, media such as a CD-ROM, etc.

Target Preparation Tool 190 creates various configuration files to automate the installation of the operating system as part of block 318. In one embodiment, Target Preparation Tool 190 creates an XML file containing a number of configuration parameters, and passes the name and location of that file to the operating system installation program, which the operating system installation program then uses to properly install on the target system. Once operating system installation is complete, Migration Wizard 104 installs target discovery module on WINDOWS Server 100 in a block 320.

In a block 322, Target Installer 128 creates a backup of the system configuration of WINDOWS Server 100 prior to installing or removing any components. This operation can be skipped if the user so chooses. Configuration files only, or configuration and system files, e.g. programs, applications, modules, libraries, etc. can be backed up; such backup can occur to media such as a CD-ROM or to another server such as Repository Server 150.

Target Discovery Module 124 compares the list of software and modules indicated by Target List 180 with the operating system, software modules, and applications installed on target WINDOWS Server 100. Based on this comparison, Target Installer 128 installs necessary components on WINDOWS Server 100, and removes any conflicting components, as depicted in a block 324.

In a block 326, Target Configuration Module 130 configures the operating system services and applications on WINDOWS Server 100 to provide the services indicated by Target List 180. In one embodiment, Target Configuration Module 130 configures the WINDOWS File, Print, and Networking services to provide file sharing, print, and authentication services. In another embodiment, Target Configuration Module 130 configures the Advanced Server for UNIX application, ported to run on the WINDOWS operating system, to provide file sharing, print, and authentication services. In one embodiment, Target Configuration Module 130 configures the WINDOWS File, Print, and Network services or the ported Advanced Server for UNIX application to act as a Primary Domain Controller, as a domain member server, or as a stand-alone server. In another embodiment, Target Configuration Module 130 creates particular file shares, and configures WINDOWS File services or the ported Advanced Server for UNIX to make the shares accessible to client computers. In yet another embodiment, Target Configuration Module 130 configures WINDOWS File, Print, and directory services or a ported version of Advanced Server for UNIX with groups, users, and permission information. One skilled in the art will recognize that Advanced Server for UNIX could be replaced with another application or piece of software capable of providing file, print, and authentication services. Target Configuration Model 130 can configure target LINUX Server 140 based on Target List 180 or based on direct communication from Configuration Conversion Tool 110, over a network.

Once configuration is completed, according to the user's instructions, Data Move Module 120 moves or copies files stored on the source server (e.g., LINUX server 140 or LINUX server 142) to target WINDOWS Server 100, as provided in a block 328. As shown by a decision block 330, in the case of a move, files are deleted from the source server in a block 732. Optionally, files are backed up prior to or during the copy or move to Intermediate Server 122 or to Repository Server 150, or backed up to media inserted into the source system such as a writeable CD-ROM, a secondary disk drive, tape, or other media. In this way, target WINDOWS Server 100 now stores the data originally accessible on the source server (e.g., LINUX server 140 or LINUX server 142).

In a block 329, Data Move Module 120 may scan for viruses and delete or quarantine infected files prior to, during, or after the move as an integrated part of migration process 300. It will be recognized that such scanning can occur as a function call within Data Move Module 120, as a call or an external program such as a commercial anti-virus scanning product, or via other means. In a related technique, Target Preparation Tool 190 can scan for viruses and delete or quarantine files on target WINDOWS Server 100 as an integrated part of migration process 300.

After the operations of the migration process so far outlined above have been completed, if so directed by the user in a block 334, Migration Wizard 104 can rename the source server to a different name in a block 336 and then communicate with Target Configuration Module 130 so that it renames target WINDOWS Server 100 to have the name previously used for the source server. In this way, the user can access the new server 100 using the same server name as previously used for source server 140 or 142 with no change. In another embodiment, the renaming process takes place prior to any migration occurring. It will be recognized by one skilled in the art that the user direction described can occur at any point during the migration process, such as at the beginning, even though the rename takes place at the end of the process.

As part of or separate from the migration process, translated configuration information can be stored on Repository Server 150. With configuration information stored on Repository Server 150, servers with the same configuration (but with slight modifications, such as server name) can easily be created, such as WINDOWS Server 102. In the case where a backup server is desired or numerous similar configurations are desired, Repository Server 150 makes the duplication and deployment with slight modification of configurations easy.

Figure 2:
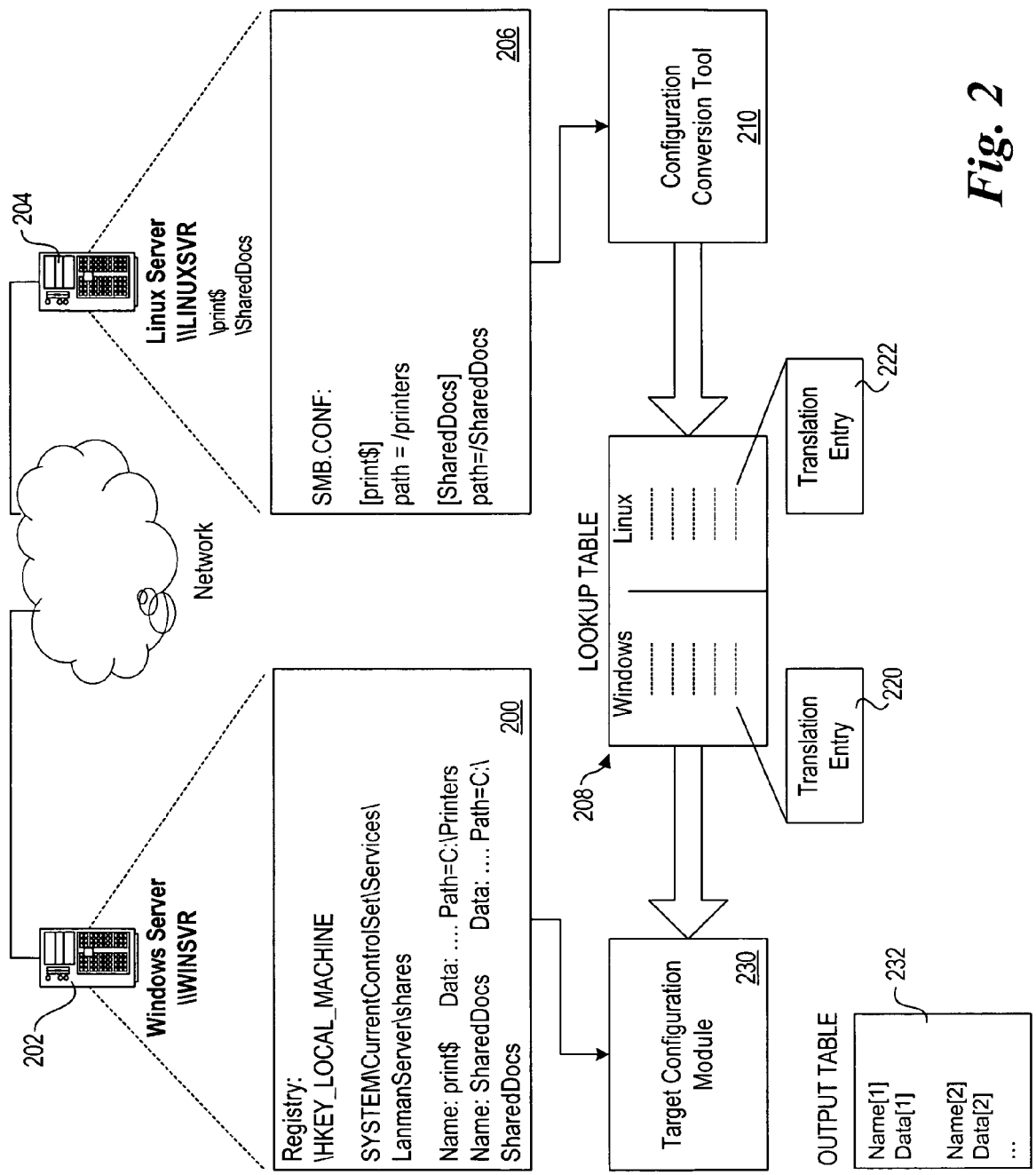
FIG. 2 is a drawing illustrating the LINUX to WINDOWS automated translation process.

FIG. 2 illustrates a detailed view of one embodiment of the automated translation process invoked by the present invention to move settings from a LINUX Server 204 to WINDOWS Server 202. WINDOWS Server 202 is a computer running any of a number of versions of the WINDOWS operating system, including, but not limited to, "WINDOWS NT" and "WINDOWS 2000." LINUX Server 204 is a computer running any of a number of versions of the LINUX operating system, including, but not limited to, "Red Hat LINUX Enterprise Edition 3 AS."

In FIG. 2, Registry 200 contains a set of data files commonly used by the WINDOWS operating system and by applications that run on WINDOWS to store configuration data and other settings. File SMB.CONF 206 is a configuration file used by the Samba program referenced earlier to store its configuration and settings information. Registry 200 contains settings related to file shares in Name-Value pairs, i.e. Name contains the name of the file share, while Value contains information about the file share, including but not limited to the path and permissions for the share. File SMB.CONF 206 contains similar information, but in different form. The illustrated embodiment of the present invention uses a lookup table 208 to translate between the settings as stored on LINUX Server 204 and WINDOWS Server 202.

Figure 4:
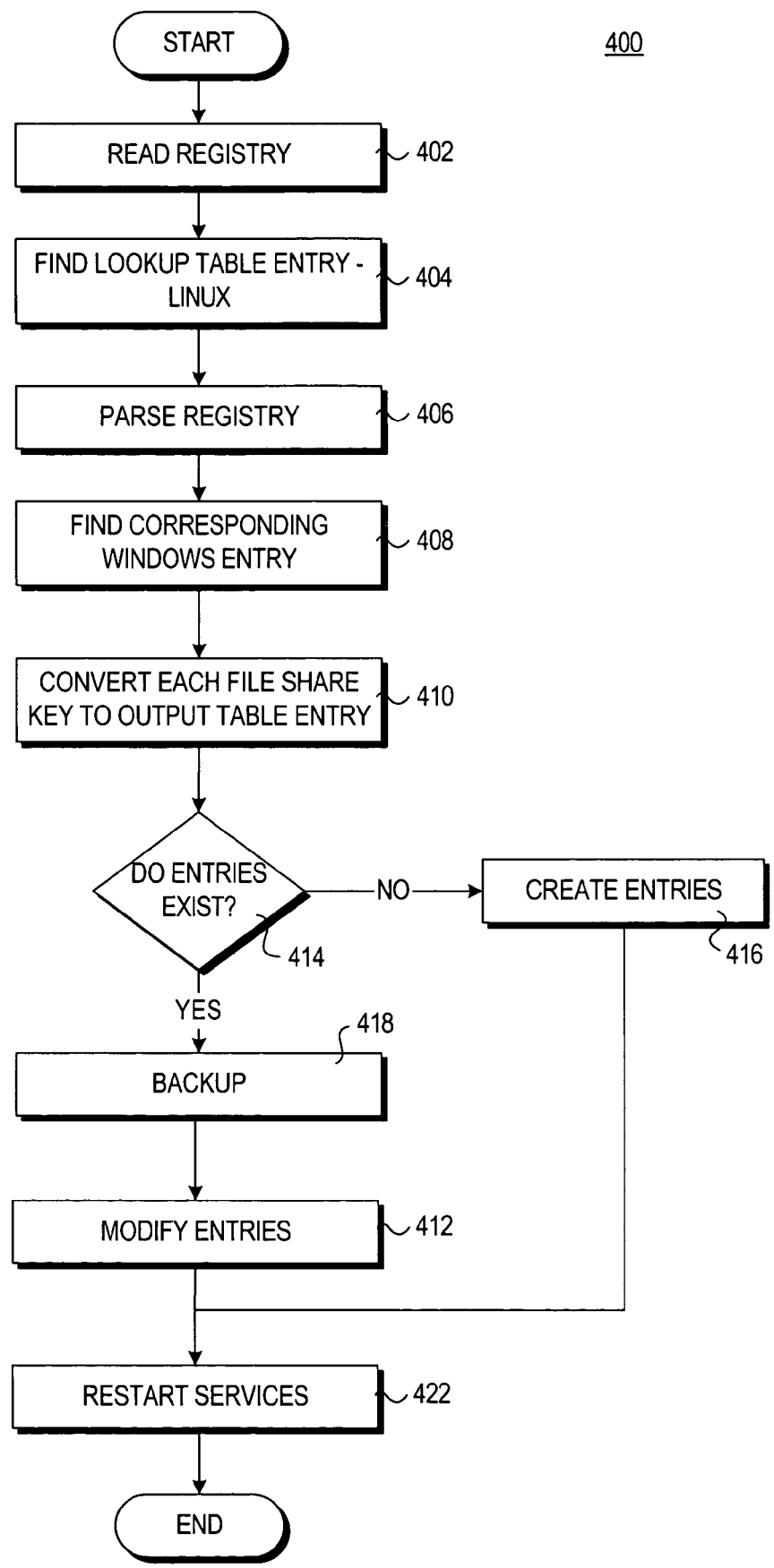
FIG. 4 is a flowchart illustrating operations and logic performed during another portion of the LINUX to WINDOWS migration process, according to one embodiment of the invention.

After initialization by the user, as shown in FIG. 4, Configuration Conversion Tool 210 reads SMB.CONF file 206 during a conversion process 400 to obtain the settings related to file shares on LINUX Server 204, e.g. the two directories shared by LINUX Server 204, "print$" and "SharedDocs," as shown in a block 402. Reading is accomplished by reading the registry directly using file read operations, by using standard system calls, or through other means. In one embodiment, reading is performed remotely, such that Configuration Conversion Tool 210 runs on a different system than where SMB.CONF file 206 resides.

Configuration Conversion Tool 210 uses Lookup Table 208 to translate between the WINDOWS and LINUX settings. For each Translation Entry 222 in the LINUX portion of the table, there is a corresponding WINDOWS Translation Entry 220. A particular entry may contain a simple translation such as an indicator that a Name value stored in the WINDOWS registry should be stored as the same value but written in brackets to the SMB.CONF file on LINUX. Alternatively, a particular entry may be more complex, including script, commands to execute, programs to run, multiple text configuration files to be modified, etc. Finding lookup table entries for WINDOWS Name-Value pairs is performed in a block 404.

In one embodiment, Configuration Conversion Tool 210 looks for Translation Entry 222 "MoveFileShare" in block 404. Translation Entry 220 directs Configuration Conversion Tool 212 to parse the SMB.CONF file, for each share name in SMB.CONF block 200 in a block 406. In a block 408, Configuration Conversion Tool 210 finds the corresponding MoveFileShare Translation Entry 220 in the WINDOWS portion of the table, which directs Configuration Conversion tool 210 to convert the parsed entries from SMB.CONF block 200 into writeable form for Target Configuration Module 230 in a block 410.

In a block 412, each "Name" key in SMB.CONF block 200 is converted into a corresponding entry in an Output Table 232. In one embodiment, Output Table 232 is an array of structures containing the text variables Name and Data. One skilled in the art will recognize that Output Table 232 could be implemented in a variety of forms, such as a linked list, values written to a file, etc.

Next, as directed by Translation Entry 222, Target Configuration Module 230 determines whether the registry entries to be created already exist in block 414. If the entries do not exist in registry 200, Target Configuration Module 230 creates new entries in registry 200 in block 416. If the entries do exist, Target Configuration Module 230 backs up the existing entries in block 418 to a text file. Then, in block 412, Target Configuration Module 230 modifies the existing entries with the new values from table 232. That is, if the Name values from table 232 are found in registry 200, the Data values in registry 200 are modified with the data values from table 232. In one embodiment, Target Configuration Module 230 uses the WINDOWS operating system registry application programming interfaces, such as RegOpenKeyEx and RegSetValueEx to create or modify registry entries. The result of the process is an automatic migration and translation of settings from LINUX Server 204 to WINDOWS Server 202.

Figure 5:
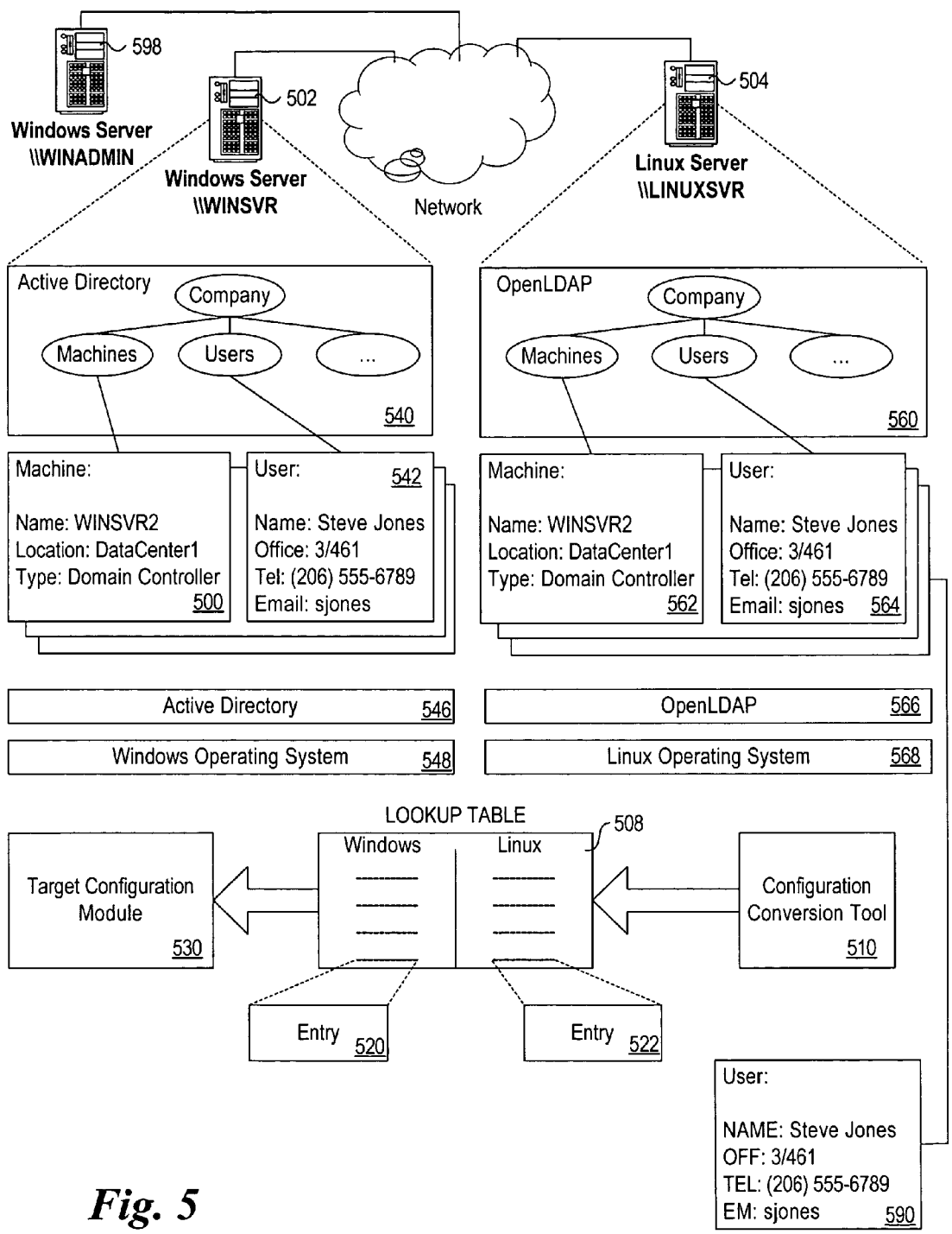
FIG. 5 is a drawing illustrating an embodiment of the present invention, the automated migration of directory services information from LINUX to WINDOWS.
Figure 6:
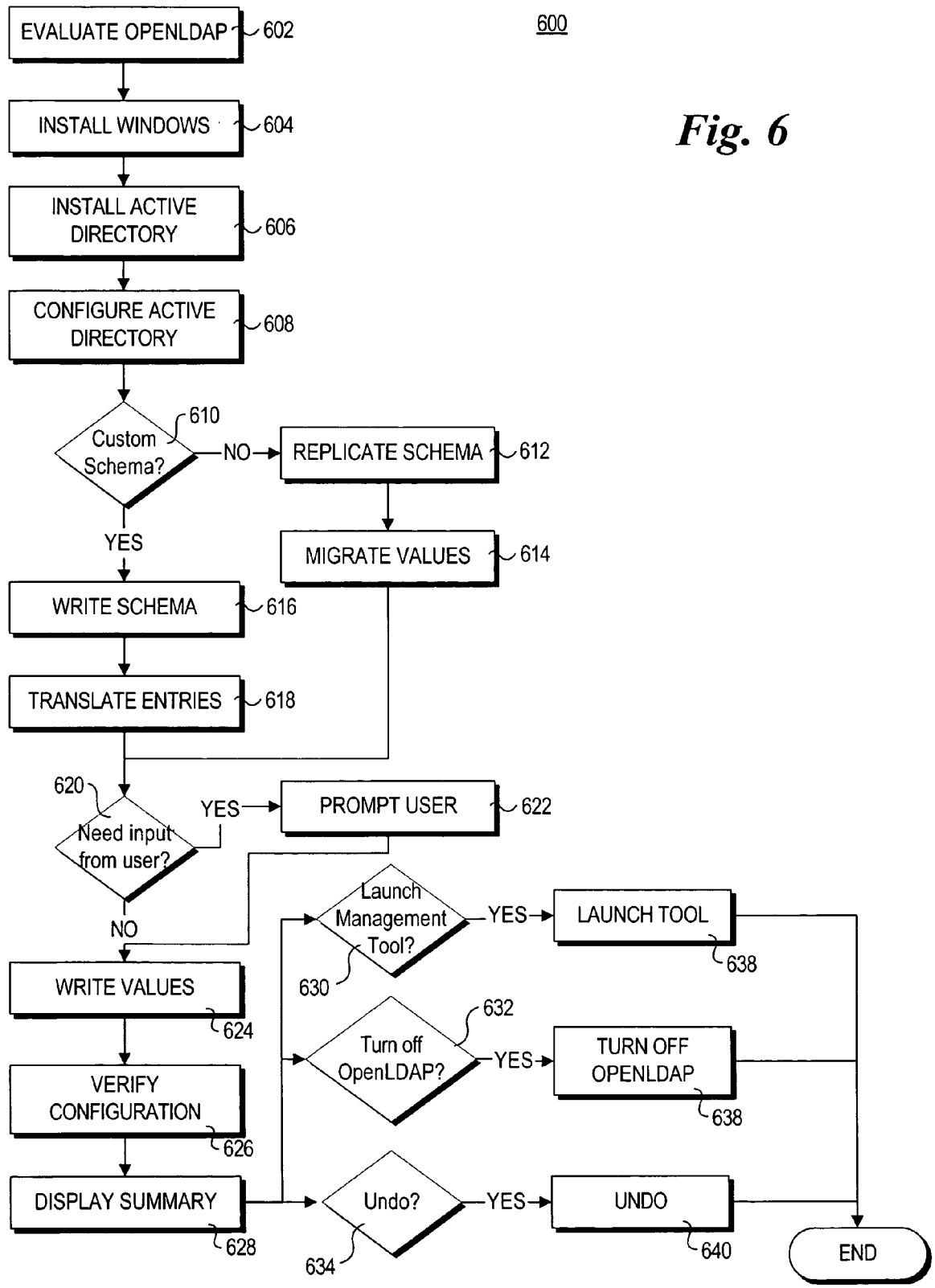
FIG. 6 is a flowchart illustrating operations and logic performed during a directory services migration process, according to one embodiment of the invention.

In another embodiment, as shown in FIG. 5, a Configuration Conversion Tool 510 migrates OpenLDAP (a centralized repository for enterprise directory information running on LINUX Server 504) settings to a WINDOWS Server 502, as illustrated by the process flow 600 of FIG. 6. The process begins in a block 602, wherein Configuration Conversion Tool 510, running either on LINUX Server 504 or on another machine with access to the network, such as a WINDOWS Server 598, evaluates an OpenLDAP database 560 (also referred to as a repository). In one embodiment, this evaluation is performed using the Lightweight Directory Access Protocol (LDAP) Application Programming Interfaces (APIs) for accessing the data contained within OpenLDAP database 560. In another embodiment, the OpenLDAP database files are read directly.

In one embodiment, Configuration Conversion Tool 510 installs WINDOWS operating system software 548, if necessary, on server 502, in a block 604, followed in a block 606 by installing Active Directory services software 546, if it is not already installed on WINDOWS Server 502. Configuration Conversion Tool 510 then configures Active Directory software 546, in a block 608. It will be recognized that Active Directory is an example of one directory services application and that a number of such applications could be used, including, but not limited to, Novell eDirectory.

Based on user input at a decision block 610, in one embodiment, a Target Configuration Module 530 configures Active Directory repository 540 to have the same schema as OpenLDAP database 560. That is, both the field types, such as Name, Office, etc. and the structure, such as the relationship between Company and Machines and Users, of OpenLDAP database 560 are, in an innovative aspect of the invention, automatically replicated into Active Directory repository 540 by Configuration Conversion Tool 510, as depicted in a block 612. In another embodiment, Target Configuration Module 530 configures Active Directory repository 540 with a customized, user-defined, or application-defined schema, or Active Directory is configured with its default schema settings, as depicted by a block 616.

In the case that Active Directory repository 540 was filled via the replication process, the Configuration Wizard reads each item from OpenLDAP database 560. In a block 614, it finds the associated Translation Entry 522 in Lookup Table 508 and the associated Translation Entry 520 in the WINDOWS portion of Lookup Table 508. Following the directions of Entry 520, Target Configuration Module 530, directed by Configuration Conversion Tool 510, writes the corresponding entries to Active Directory repository 540 in a block 624. Thus the Name key and its associated value Steve Jones in User entry 564 are written by Target Configuration Module 530 to Active Directory repository 540 resulting in entry 542 in block 624.

In the case that Active Directory repository 540 was filled via the writing process, Target Configuration Module 530 follows the instructions in Entry 520 to translate the OpenLDAP entry into an appropriate Active Directory repository 540 entry, and repeats for all entries, as depicted in a block 618. In one embodiment, the members of the OpenLDAP User entry 590 are translated into the members of the User entry 542, with NAME key in OpenLDAP User entry 590 translated into Name key in the Active Directory schema, the OFF key to Office, TEL to Tel, and EM to Email. The Target Configuration Module writes the values, such as "Steve Jones," associated with each key, in block 624.

For any fields where Lookup Table 508 does not provide instructions on how to translate a given field in block 618 or where a migration issue or error occurs in block 614, at decision block 620, Configuration Conversion Tool 510 prompts the user for input in accordance with a block 622, or, depending on the options selected by the user, automatically creates a new field.

In one embodiment, once the migration or translation process is complete, Configuration Conversion Tool 510, in conjunction with Target Configuration Module 530 verifies the configuration in a block 626, running queries against Active Directory 546 and OpenLDAP 566 to ensure the results are the same. Configuration Conversion Tool 510 presents the user with configuration screens in which the user can configure which validation tests to run. Once the process is complete, Configuration Conversion Tool 510 presents the user with a summary of the results in a block 628, with a detailed report also available. The summary indicates what actions were taken, and the success/failure status of the operations. The detailed report shows similar information, but in more detail, showing each entry that was migrated, details about the schema, etc.

In a block 630, Configuration Conversion Tool 510 presents the user with the option to launch a management tool directly, and then launches a management tool in a block 636, if the user desires to make changes to the configuration or perform other management tasks. Configuration Conversion Tool 510 also presents the user with the option to turn off OpenLDAP 566, in which case if selected at decision block 632, Configuration Conversion Tool 510 calls the appropriate APIs to stop OpenLDAP 566. Configuration Conversion Tool 510 also allows the user to undo the migration operation, as depicted by a decision block 634, and if selected undoes the migration process in a block 640.

Figure 7:
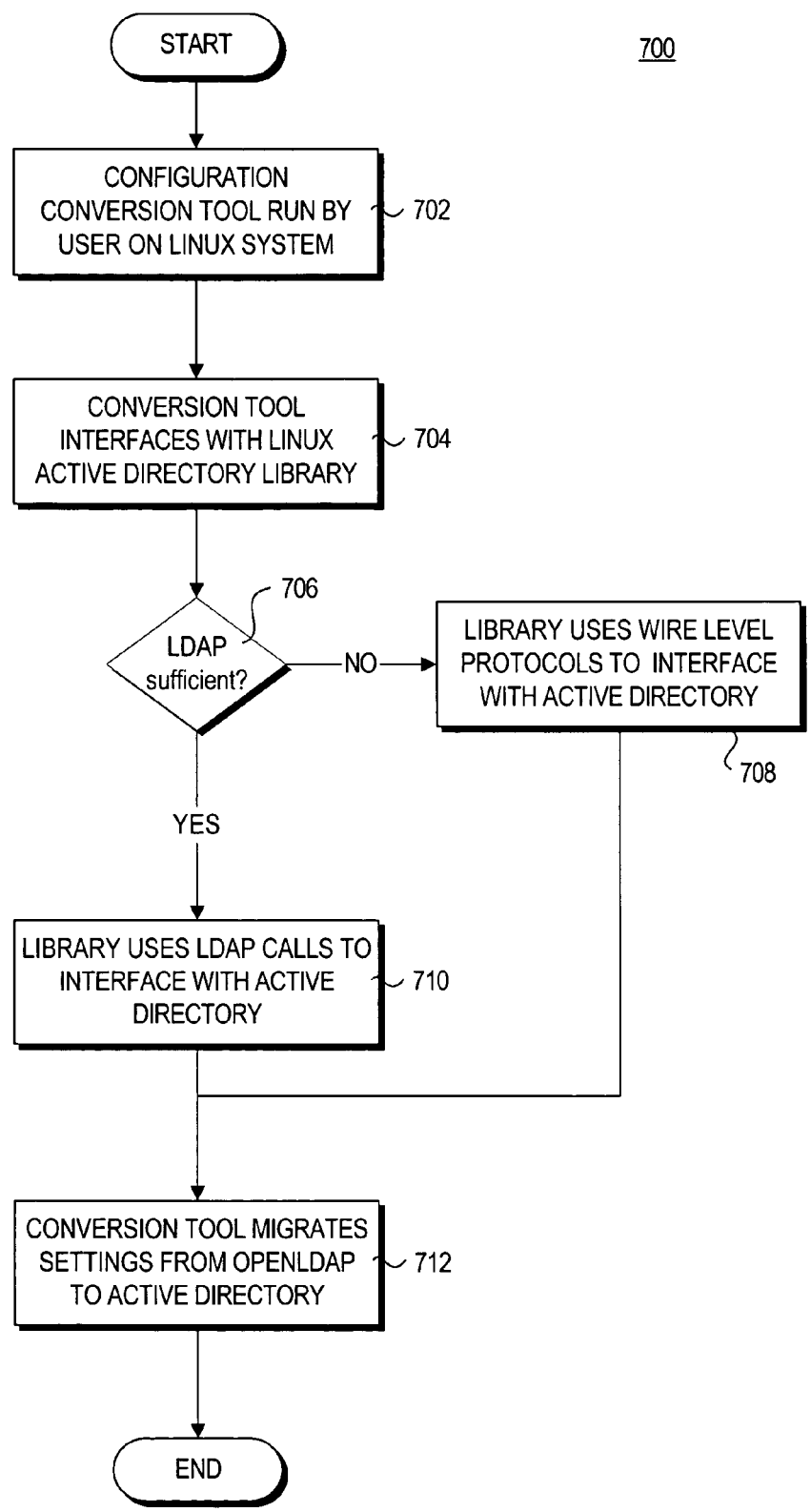
FIG. 7 is a flowchart illustrating operations and logic performed during a directory services migration process under which OpenLDAP settings are migrated, according to one embodiment of the invention.
Figure 9:
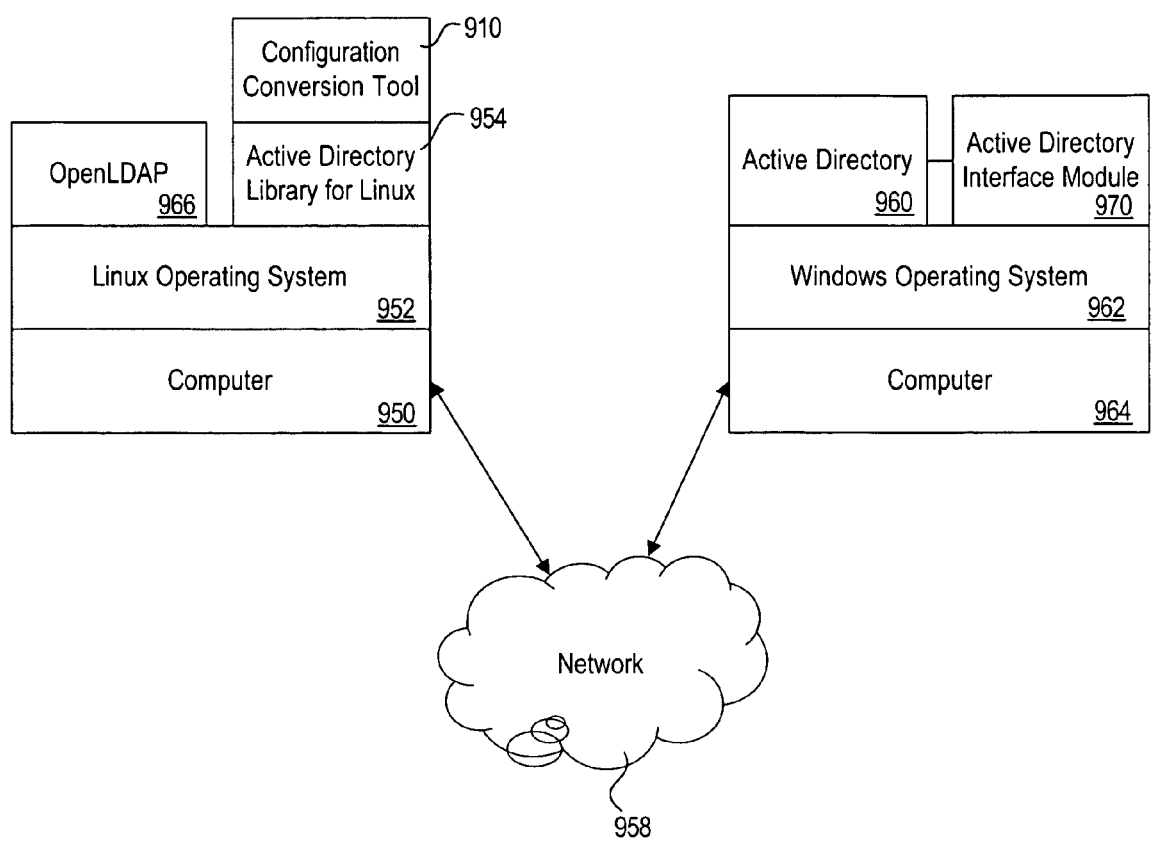
FIG. 9 is a schematic diagram illustrating software components on a source and target computer used for facilitating the migration process of FIG. 7.

With reference to the flowchart of FIG. 7 and the architecture diagram of FIG. 9, one embodiment of the present invention allows the migration process to be initiated from a system running the LINUX operating system 952. The process begins in a block 702, wherein the Configuration Conversion Tool 910 is run by a user on LINUX computer 950. In a block 704, Configuration Conversion Tool 910 interfaces with a specially-developed Active Directory Library for LINUX 954 on a LINUX server that implements function calls typically supported by the Active Directory programming interface on WINDOWS. In a block 706, Active Directory Library for LINUX 954 determines whether it can interface with Active Directory 960 running on WINDOWS operating system 962 on computer 964 over network 958 through a Lightweight Directory Access Protocol (LDAP) function call or by simulating a native Active Directory call using wire level protocols. If LDAP calls cannot be used, the library uses wire level protocols to interface with Active Directory, simulating native Active Directory calls, as depicted in a block 708. If LDAP calls can be used, the library uses LDAP calls to interface with Active Directory 960 in a block 710. Using the appropriate calls, Conversion Tool 910 migrates settings from OpenLDAP repository 966 to Active Directory 960, following aspects of the procedure described above with reference to FIG. 6. In another embodiment, Configuration Conversion Tool 910 interfaces with innovative Active Directory Interface Module 970, running on WINDOWS Operating System 962, which has access to the native Active Directory programming interfaces.

Figure 8:
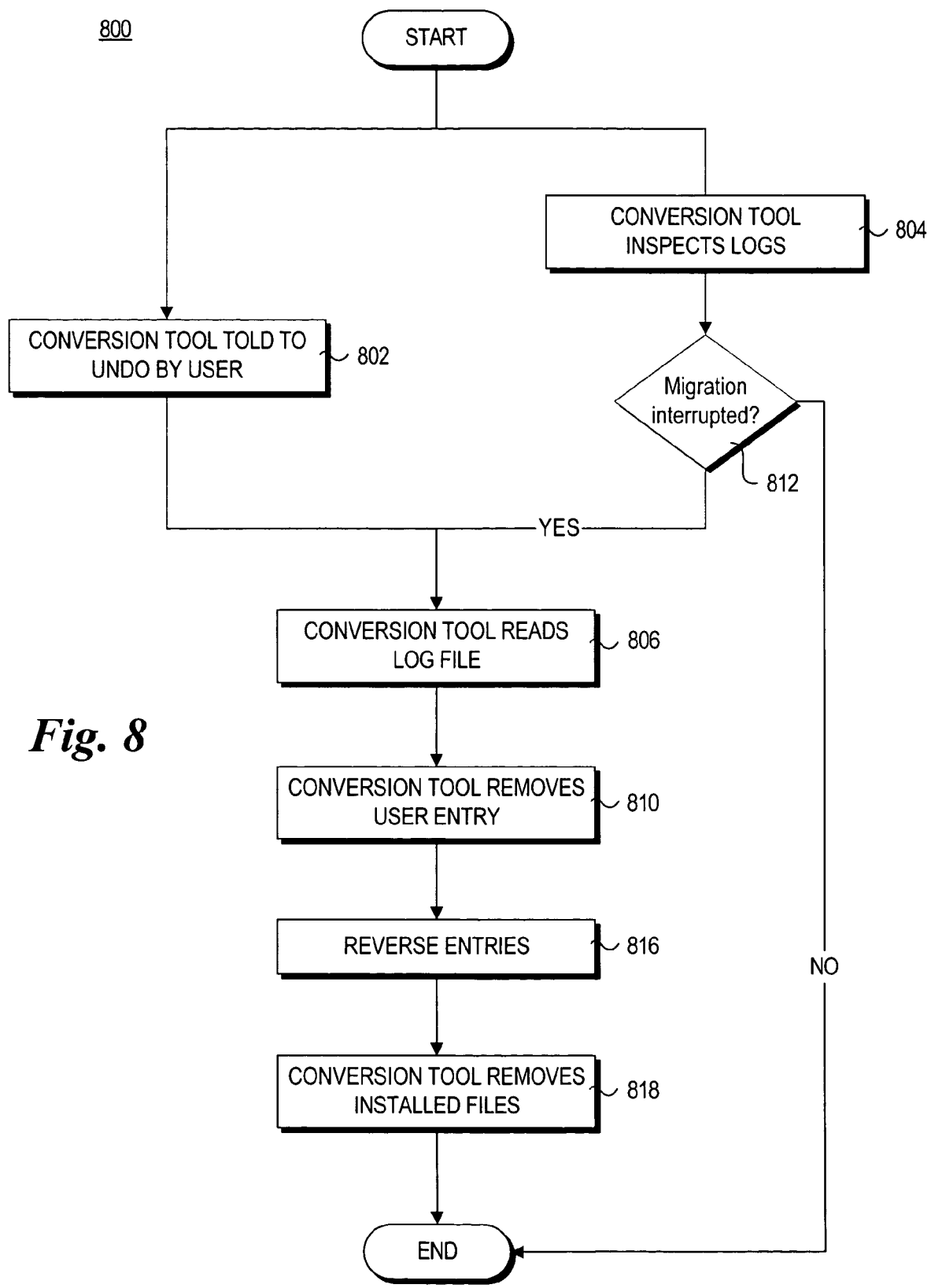
FIG. 8 is a flowchart illustrating operations performed during an undo process, according to one embodiment of the invention.

As illustrated by process flow 800 in FIG. 8, during or after the migration process, Configuration Conversion Tool 510 can undo the migration process. In one embodiment, when Configuration Conversion Tool 510 launches, it checks its internal status logs to determine if any migrations were on-going, as depicted in a block 804. For example, as a result of a power outage, a migration could be interrupted, resulting in an unknown or non-working state for the source and target systems.

Upon recognizing that a migration was in process at a decision block 812 or upon indication by the user in accordance with a block 802, Configuration Conversion Tool 510 commences the undo process. In one embodiment, during the migration process, Configuration Conversion Tool 510, in conjunction with Target Configuration Module 510 keeps a log of all changes made to LINUX server 504. More specifically, before a change is made, the change to be made is written to the log file; when the change is completed, the log file is updated. Under one embodiment of the undo process, Configuration Conversion Tool 510 with Target Configuration Module 530 reads the log file in accordance with a block 806. In a block 810, Configuration Conversion Tool 510 deletes a user entry from Active Directory repository 546. In a block 816, Configuration Conversion Tool 510 reverses the action indicated by each of the remaining log file entries, including, but not limited to, deleting entries that were added in a block 818. In another embodiment, rather than undoing individual actions, Configuration Conversion Tool 510 replaces all written files with originals from a stored backup. The result is that WINDOWS server 502 returns to its original configuration.

As discussed above, the LINUX to WINDOWS migration functions are implemented via execution of software components. Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

Figure 10:
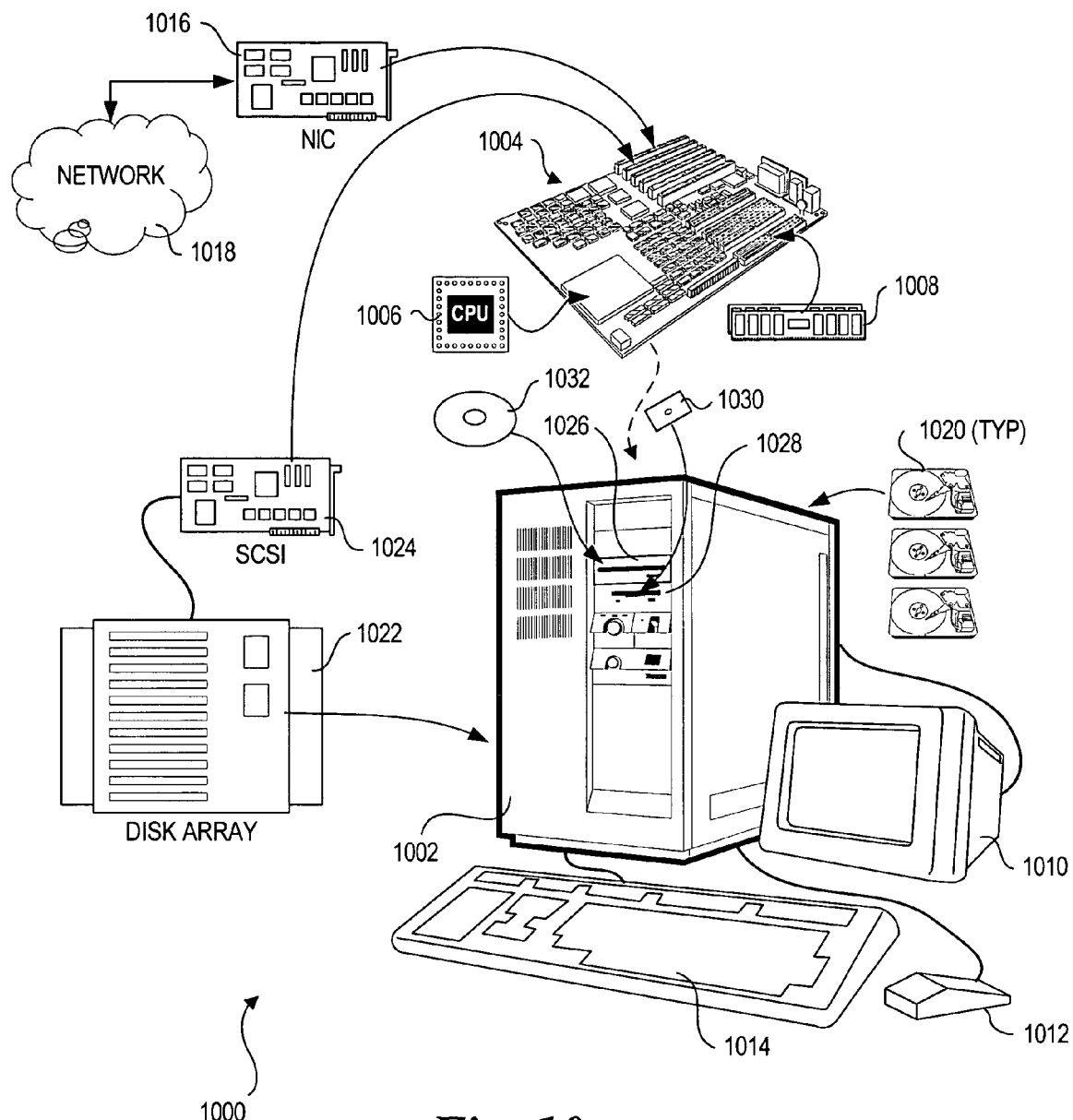
FIG. 10 is a schematic diagram of an exemplary computer system for practicing embodiments of the invention.

With reference to FIG. 10, a generally conventional computer server 1000 is illustrated, which is suitable for use in connection with practicing embodiments of the present invention. Computer server 1000 is generally illustrative of source and target servers discussed above. Examples of computer systems that may be suitable for these purposes include stand-alone and enterprise-class servers operating UNIX-based and LINUX-based operating systems, as well as servers running the WINDOWS NT or WINDOWS 2000 Server or WINDOWS 2003 operating systems.

Computer server 1000 includes a chassis 1002 in which is mounted a motherboard 1004 populated with appropriate integrated circuits, including one or more processors 1006 and memory (e.g., DIMMs or SIMMs) 1008, as is generally well known to those of ordinary skill in the art. A monitor 1010 is included for displaying graphics and text generated by software programs and program modules that are run by the computer server. A mouse 1012 (or other pointing device) may be connected to a serial port (or to a bus port or USB port) on the rear of chassis 1002, and signals from mouse 1012 are conveyed to the motherboard to control a cursor on the display and to select text, menu options, and graphic components displayed on monitor 1010 by software programs and modules executing on the computer. In addition, a keyboard 1014 is coupled to the motherboard for user entry of text and commands that affect the running of software programs executing on the computer. Computer server 1000 also includes a network interface card (NIC) 1016, or equivalent circuitry built into the motherboard to enable the server to send and receive data via a network 1018.

File system storage may be implemented via a plurality of hard disks 1020 that are stored internally within chassis 1002, and/or via a plurality of hard disks that are stored in an external disk array 1022 that may be accessed via a SCSI card 1024 or equivalent SCSI circuitry built into the motherboard. Optionally, disk array 1022 may be accessed using a Fibre Channel link using an appropriate Fibre Channel interface card (not shown) or built-in circuitry.

Computer server 1000 generally may include a compact disk-read only memory (CD-ROM) drive 1026 into which a CD-ROM disk may be inserted so that executable files and data on the disk can be read for transfer into memory 1008 and/or into storage on hard disk 1020. Similarly, a floppy drive 1028 may be provided for such purposes. Other mass memory storage devices such as an optical recorded medium or DVD drive may also be included. The machine instructions comprising the software components that cause processor(s) 1006 to implement the operations of the present invention that have been discussed above will typically be distributed on floppy disks 1030 or CD-ROMs 1032 (or other memory media) and stored in one or more hard disks 1020 until loaded into memory 1008 for execution by processor(s) 1006. Optionally, the machine instructions may be loaded via network 1018 as a carrier wave file.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for automatically migrating from a LINUX server to a WINDOWS target server, comprising:
    automatically extracting LINUX configuration information pertaining to LINUX services hosted by a LINUX server;
    automatically generating WINDOWS configuration information for a WINDOWS target server to support WINDOWS services that are analogous to the Linux services hosted by the LINUX server; and
    automatically installing appropriate Windows components and configuration files on the WINDOWS target server to perform the analogous LINUX services in view of the WINDOWS configuration information that is generated,
    wherein the automatic migration includes automatically migrating OpenLDAP (Lightweight Directory Access Protocol) configuration information on the LINUX server to corresponding WINDOWS Active Directory information on the WINDOWS target server.

2. The method of claim 1, wherein the analogous services include file share services, the method further comprising:
    extracting LINUX file share information from Linux file share configuration information stored on the Linux server;
    translating the LINUX file share configuration information into corresponding Windows registry entries; and
    storing the WINDOWS registry entries on the WINDOWS target server.

3. The method of claim 1, further comprising:
    automatically migrating data files stored on the LINUX server to the WINDOWS target server.

4. The method of claim 3, further comprising:
    generating a backup of the data files that are migrated.

5. The method of claim 3, wherein migrating the data files comprises:
    copying the data files from the LINUX server to the WINDOWS target server; and
    deleting the data files on the LINUX server.

6. The method of claim 5, further comprising:
    scanning the data files for viruses; and
    not copying a data file to the WINDOWS target server if the data file is detected to have a virus.

7. The method of claim 1, further comprising:
    determining a network name for the LINUX server; and
    renaming the WINDOWS target server with the network name of the LINUX server.

8. The method of claim 1, wherein migrating the OpenLDAP information comprises:
    extracting OpenLDAP information from an OpenLDAP database hosted by the LINUX server; and replicating the OpenLDAP information in a WINDOWS Active Directory repository hosted by the WINDOWS target server.

9. The method of claim 1, further comprising:

enabling a user to selectively undo all or a portion of a migration process.

10. The method of claim 1, further comprising:

searching a network to identify LINUX and potential WINDOWS target servers connected to the network; and enabling a user to select a LINUX server comprising a migration source and a WINDOWS target server comprising a migration target, wherein configuration information is migrated from the migration source to the migration target.

11. The method of claim 1, further comprising:

storing the WINDOWS configuration information in a repository; and retrieving the WINDOWS configuration information from the repository; and installing appropriate WINDOWS components and configuration files on multiple WINDOWS target servers to perform the analogous WINDOWS services in view of the WINDOWS configuration information that is retrieved.

12. The method of claim 1, wherein installation of the appropriate WINDOWS components and configuration files on the WINDOWS target server includes automatically installing a WINDOWS operating system on the WINDOWS target server.

13. The method of claim 1, wherein the WINDOWS target server comprises a WINDOWS server running an instance of the WINDOWS operating system prior to initiation of the migration process.

14. The method of claim 1, wherein the OpenLDAP (Lightweight Directory Access Protocol) configuration information on the LINUX server comprises LINUX OpenLDAP configuration information.

15. The method of claim 1, wherein the OpenLDAP (Lightweight Directory Access Protocol) configuration information on the LINUX server that is migrated to corresponding WINDOWS Active Directory information comprises object security permissions.

16. A machine-readable medium having stored thereon a set of instructions that, when executed by a machine, cause said machine to perform operations to facilitate migration from a LINUX server to a WINDOWS server, the operations including:

extracting Linux configuration information pertaining to LINUX services hosted by a LINUX server;

migrating OpenLDAP (Lightweight Directory Access Protocol) configuration information on the LINUX server to corresponding WINDOWS Active Directory information on the WINDOWS target server;

generating Windows configuration information for a target server to support WINDOWS services analogous to the LINUX services hosted by the LINUX server, the WINDOWS configuration information including WINDOWS registry entries; and installing, in view of the WINDOWS configuration information that is generated, the WINDOWS registry entries and appropriate WINDOWS components on the target server to enable the target server to perform the WINDOWS services that are analogous to the LINUX services.

17. The machine-readable medium of claim 16, wherein the WINDOWS services that are analogous to the LINUX services include file share services, and execution of the instructions performs further operations including:

extracting LINUX file share information from LINUX file share configuration information stored on the LINUX server;

translating the LINUX file share configuration information into corresponding WINDOWS registry entries; and storing the WINDOWS registry entries on the target server.

18. The machine-readable medium of claim 16, wherein the OpenLDAP (Lightweight Directory Access Protocol) configuration information on the LINUX server comprises LINUX OpenLDAP configuration information.

19. The machine-readable medium of claim 16, wherein the OpenLDAP (Lightweight Directory Access Protocol) configuration information on the LINUX server that is migrated to corresponding WINDOWS Active Directory information comprises object security permissions.

20. The machine-readable medium of claim 16, wherein the instructions are embodied as a LINUX to WINDOWS migration software tool.

* * * * *